July 24, 1923.

A. L. HESS 1,462,964

SEPARABLE FASTENER

Filed Jan. 8, 1923

A. L. Hess,
Inventor

Witnesses:

Patented July 24, 1923.

1,462,964

UNITED STATES PATENT OFFICE.

ABRAHAM L. HESS, OF HESSTON, KANSAS.

SEPARABLE FASTENER.

Application filed January 8, 1923. Serial No. 611,287.

*To all whom it may concern:*

Be it known that I, ABRAHAM L. HESS, a citizen of the United States, residing at Hesston, in the county of Harvey and State of Kansas, have invented certain new and useful Improvements in Separable Fastener, of which the following is a specification.

My invention relates to improvements in separable fasteners, of the hook and eye type, and the primary object thereof, resides in the provision of such a fastener, wherein the hook and eye members are so formed as to permit the same to be readily secured to and detached from the garments to which they are applied, and this in a simple and expeditious manner, and without the usual necessity of sewing or riveting these members to the garment.

The nature and advantages of the invention will be better understood when the following detailed description is read in connection with the accompanying drawing, the invention residing in the construction, combination, and arrangement of parts as claimed.

In the drawing forming part of this application, like numerals of reference indicate similar parts in the several views, and wherein.

Figure 1:
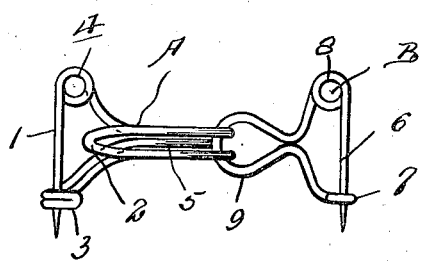
Figure 1 is a plan view of my improved fastener, the two elements thereof being shown as interlocked with each other.
Figure 2:
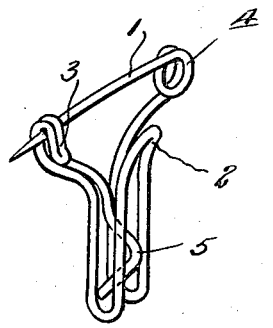
Figure 2 is a perspective view of the hook member of the fastener.
Figure 3:
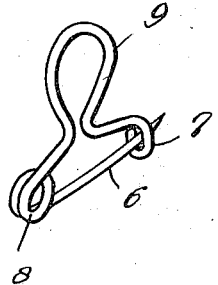
Figure 3 is a similar view of the eye member thereof.

In the drawing, A designates the hook member, and B the eye member of the fastener. Each of these members are formed from a single length of spring wire, and bent into substantially the shape as shown.

The length of spring wire forming the member A is so bent as to provide a pin portion 1, a main hook portion 2, and another smaller hook 3, this latter hook adapted for receiving the free end of the pin 1 after the same has been inserted through the garment. The inner end of the pin 1 is formed with a coil 4, for causing the pin to normally extend away from its hook 3 for purposes apparent. One end of the wire forming the member A is so bent as to provide a spring abutment 5 beneath the hook portion 2, and at the lower end thereof, effecting a means for retaining the eye portion of the member B within the hook 2. This abutment is of such a nature as to be depressed by the eye of the member B for allowing the same to pass to the lower end of the said hook 2. One end of the length of wire forming the eye member B functions as a pin 6 adapted for engagement at its free end with a hook 7 formed upon the opposite end of the length of wire, and after the pin has been extended through the garment. The inner end of the pin 6 is also formed with a coil 8 for purposes similar to the coil 4 in the hook member A, and between this coil 8 and hook 7, the length of wire is so bent as to form a central eye 9.

In view of the above description, it will at once be apparent that the hook and eye members A and B may be readily secured, and as readily detached from a garment through the instrumentality of the pin members 1 and 6 formed thereon, and when these members are inter-engaged as in Figure 1, the spring abutment 5 of the member A will effectively maintain the eye 9 within its hook 2, and the same is forcibly removed therefrom.

Although I have shown and described the preferred embodiment of the present invention, it is nevertheless to be understood that minor changes may be made therein, without departing from the spirit and scope of the invention as claimed.

What I claim as new is:—

A garment hook adapted for the use with an eye, said hook formed from a single length of wire and having the usual body portion and bill, one of the free ends of said wire bent to form a coil with a transverse pin extending therefrom, the other end of said wire bent to provide a hook to receive the free end of the pin and then bent back to extend between and parallel to the members of the body portion and forming a central member, a hump formed in the free end of the central member at the entrance to the loop of the bill and extending in close proximity to the bill, the free end of the central member terminating at the outer ends of the members of the body portion.

In testimony whereof I affix my signature.

ABRAHAM L. HESS.